United States Patent
Rizvi et al.

(10) Patent No.: US 7,443,829 B2
(45) Date of Patent: Oct. 28, 2008

(54) UPLINK INTERFERENCE CANCELLATION

(75) Inventors: Khurram Ali Rizvi, Bristol (GB); Yuk C Chow, Bristol (GB); Tomoya Horiguchi, Tokyo (JP)

(73) Assignee: Toshiba Corporation, Tokyo (JP)

( * ) Notice: Subject to any disclaimer, the term of this patent is extended or adjusted under 35 U.S.C. 154(b) by 335 days.

(21) Appl. No.: 11/159,345

(22) Filed: Jun. 23, 2005

(65) Prior Publication Data
US 2006/0050662 A1 Mar. 9, 2006

(30) Foreign Application Priority Data
Sep. 9, 2004 (GB) .................. 0420060.6

(51) Int. Cl.
*H04B 7/216* (2006.01)
*H04J 3/00* (2006.01)
*H04Q 7/24* (2006.01)

(52) U.S. Cl. .................. 370/342; 370/336; 370/338

(58) Field of Classification Search .................. 370/342, 370/479, 336, 338; 375/144, 148, 346; 455/63.1, 455/296
See application file for complete search history.

(56) References Cited

U.S. PATENT DOCUMENTS 6,104,746 A * 8/2000 Ishikawa et al. ............. 375/140
6,381,229 B1 * 4/2002 Narvinger et al. ........... 370/328
6,442,153 B1 * 8/2002 Dahlman et al. ............. 370/342
6,657,949 B1 * 12/2003 Jones et al. .................. 370/205
7,012,977 B2 * 3/2006 Madkour et al. ............. 375/346
2002/0009129 A1 * 1/2002 Choi et al. .................. 375/149
2003/0224784 A1 * 12/2003 Hunt et al. ............... 455/426.2
2004/0017843 A1 * 1/2004 Fitton et al. ................. 375/148
2006/0126752 A1 * 6/2006 Hansen et al. .............. 375/267
2006/0172703 A1 * 8/2006 Rensburg et al. ........... 455/63.1

FOREIGN PATENT DOCUMENTS

GB 2337419 A * 11/1999

* cited by examiner

*Primary Examiner*—Lester Kincaid
*Assistant Examiner*—Nathan Mitchell
(74) *Attorney, Agent, or Firm*—Oblon, Spivak, McClelland, Maier & Neustadt, P.C.

(57) ABSTRACT

The present invention provides a method of improving the performance of a CDMA based wireless network, such as a 3G cellular network for example. Interference cancellation is effectively performed earlier by using the channel request such as a reservation packet from a mobile terminal to estimate interference from that mobile on existing mobile users and interference on the mobile from existing mobile users, by determining the relative transmission timing of the new mobiles channel request compared with the transmission timings of the existing mobiles. The base station determine the cross-correlation between the codes already assigned to the existing users and the code to be allocated to the new user in order to determine an interference measure. This interference can then be cancelled from the new mobile when its data packets are received.

21 Claims, 11 Drawing Sheets

UPLINK INTERFERENCE CANCELLATION

FIELD OF THE INVENTION

The present invention relates to wireless communication between a mobile terminal and a base station, and the use of interference cancellation in the uplink. The present invention is particularly but not exclusively concerned with 3G or UTRAN applications.

BACKGROUND OF THE INVENTION

Third generation mobile phone networks use CDMA (Code Division Multiple Access) spread spectrum signals for communicating across the radio interface between a mobile station and a base station. These 3G networks, (and also so-called 2.5G networks), are encompassed by the International Mobile Telecommunications IMT-2000 standard (www.ituint, hereby incorporated by reference). Third generation technology uses CDMA (Code Division Multiple Access) and the IMT-2000 standard contemplates three main modes of operation, W-CDMA (Wide band CDMA) direct spread FDD (Frequency Division Duplex) in Europe and Japan, CDMA-2000 multicarrier FDD for the USA, and TD-CDMA (Time Division Duplex CDMA) and TD-SCDMA (Time Division Synchronous CDMA) for China.

Collectively the radio access portion of a 3G network is referred to as UTRAN (Universal Terrestrial Radio Access Network) and a network comprising UTRAN access networks is known as a UMTS (Universal Mobile Telecommunications System) network. The UMTS system is the subject of standards produced by the Third Generation Partnership Project (3GPP, 3GPP2), technical specifications for which can be found at www.3gpp.org. These standards include Technical Specifications 23.101, which describes a general UMTS architecture, and 25.101 which describes user and radio transmission and reception (FDD) versions 4.0.0 and 3.2.2 respectively of which are hereby incorporated by reference.

FIG. 1 shows a generic structure of a third generation digital mobile phone system at 10. In FIG. 1 a radio mast 12 is coupled to a base station 14 which in turn is controlled by a base station controller 16. A mobile communications device 18 is shown in two-way communication with base station 14 across a radio or air interface 20, known as a Um interface in GSM (Global Systems for Mobile Communications) networks and GPRS (General Packet Radio Service) networks and a Uu interface in CDMA2000 and W-CDMA networks. Typically at any one time a plurality of mobile devices 18 are attached to a given base station, which includes a plurality of radio transceivers to serve these devices.

Base station controller 16 is coupled, together with a plurality of other base station controllers (not shown) to a mobile switching centre (MSC) 22. A plurality of such MSCs are in turn coupled to a gateway MSC (GMSC) 24 which connects the mobile phone network to the public switched telephone network (PSTN) 26. A home location register (HLR) 28 and a visitor location register (VLR) 30 manage call routing and roaming and other systems (not shown) manage authentication, billing. An operation and maintenance centre (OMC) 29 collects the statistics from network infrastructure elements such as base stations and switches to provide network operators with a high level view of the network's performance. The OMC can be used, for example, to determine how much of the available capacity of the network or parts of the network is being used at different times of day.

The above described network infrastructure essentially manages circuit switched voice connections between a mobile communications device 18 and other mobile devices and/or PSTN 26. So-called 2.5G networks such as GPRS, and 3G networks, add packet data services to the circuit switched voice services. In broad terms a packet control unit (PCU) 32 is added to the base station controller 16 and this is connected to a packet data network such as Internet 38 by means of a hierarchical series of switches. In a GSM-based network these comprise a serving GPRS support node (SGSN) 34 and a gateway GPRS support node (GGSM) 36. It will be appreciated that both in the system of FIG. 1 and in the system described later the functionalities of elements within the network may reside on a single physical node or on separate physical nodes of the system.

Communications between the mobile device 18 and the network infrastructure generally include both data and control signals. The data may comprise digitally encoded voice data or a data modem may be employed to transparently communicate data to and from the mobile device. In a GSM-type network text and other low-bandwidth data may also be sent using the GSM Short Message Service (SMS).

In a 2.5G or 3G network mobile device 18 may provide more than a simple voice connection to another phone. For example mobile device 18 may additionally or alternatively provide access to video and/or multimedia data services, web browsing, e-mail and other data services. Logically mobile device 18 may be considered to comprise a mobile terminal (incorporating a subscriber identity module (SIM) card) with a serial connection to terminal equipment such as a data processor or personal computer. Generally once the mobile device has attached to the network it is "always on" and user data can be transferred transparently between the device and an external data network, for example by means of standard AT commands at the mobile terminal-terminal equipment interface. Where a conventional mobile phone is employed for mobile device 18 a terminal adapter, such as a GSM data card, may be needed.

In a CDMA spread spectrum communication system a baseband signal is spread by mixing it with a pseudorandom spreading sequence of a much higher bit rate (referred to as the chip rate) before modulating the rf carrier. At the receiver the baseband signal is recovered by feeding the received signal and the pseudorandom spreading sequence into a correlator and allowing one to slip past the other until a lock is obtained. Once code lock has been obtained, it is maintained by means of a code tracking loop such as an early-late tracking loop which detects when the input signal is early or late with respect to the spreading sequence and compensates for the change.

Such a system is described as code division multiplexed as the baseband signal can only be recovered if the initial pseudorandom spreading sequence is known. A spread spectrum communication system allows many transmitters with different spreading sequences all to use the same part of the rf spectrum, a receiver "tuning" to the desired signal by selecting the appropriate spreading sequence.

In a 3G mobile phone system the base band data is spread using a spreading or channelisation code using an Orthogonal Variable Spreading Factor (OVSF) technique. The OVSF codes allow the spreading factor to be changed whilst maintaining orthogonality between codes of different lengths. To increase the number of simultaneous users of the system the data is further spread by a scrambling code such as a Gold code. The scrambling code does not change the signal bandwidth but allows signals to or from different users to be distinguished from one another, again, because the spreading codes are substantially mutually orthogonal. The scrambling is used on top of the channelisation spreading, that is a signal at the chip rate following OVSF spreading is multiplied by the scrambling code to produce a scrambled code at the same chip rate. The chip rate is thus determined by the channelisation code and, in this system, is unaffected by the subsequent scrambling. Thus the symbol rate for a given chip rate is likewise unaffected by the scrambling.

In a 3G mobile phone system different spreading factors and scrambling code links are generally employed for the down link from the base station to the mobile station and for the up link from the mobile station to the base station. Typically the channelisation codes have a length of between 4 chips and 256 chips or, equivalently, a spreading factor of between 4 and 256 (although other spreading factors may be employed). The up link and down link radio frames generally last 10 ms, corresponding to a scrambling code length of 38400 chips although shorter frames, for example of 256 chips, are sometimes employed on the up link. A typical chip rate is 3.84 M chips/sec (Mcps), which determines the maximum bit rate for a channel—for example with a spreading factor of 16, that is 16 chips per symbol, this gives a data rate of 240 Kbps. It will be recognised that the foregoing figures are provided merely for the purposes of illustration. Where higher bit rate communications with a mobile station are required more than one such channel may be employed to create a so-called multicode transmission. In a multicode transmission a plurality of data channels are used, effectively in parallel, to increase the overall rate of data transmission to or from a mobile station. Generally the multicode data channels have the same scrambling code but different channelisation codes, albeit preferably with the same spreading factor.

In a 3G mobile phone system there are generally a number of different channels some dedicated to particular users and some common to groups of users such as all the users within a given cell or sector. Traffic is carried on a Dedicated Physical Control Channel (DPCH), or on a plurality of such channels in the case of a multicode transmission, as described above. The common channels generally transport signalling and control information and may also be utilised for the physical layer of the system's radio link. Thus a Common Pilot Channel (CPICH) is provided comprising an unmodulated code channel scrambled with a cell-specific scrambling code to allow channel estimation and equalisation at the mobile station receiver. Similarly a Sychnronisation Channel (SCH) is provided for use by the mobile station to locate network cells. A primary SCH channel is unmodulated and is transmitted using the same channelisation spreading sequence in each cell and does not employ a cell-specific scrambling code. A similar secondary SCH channel is also provided, but with a limited number of spreading sequences. Primary and Secondary Common Control Physical Channel (PCCPCH, SCCPCH) having known channelisation and spreading codes are also provided to carry control information. The foregoing signalling channels (CPICH, SCH and CCPCH) must generally be decoded by all the mobile stations and thus the spreading codes (channelisation codes and where appropriate, scrambling code) will generally be known by the mobile station, for example because the known codes for a network have been stored in the user-end equipment. Here the references to channels are generally references to physical channels and one or more network transport channels may be mapped to such a physical channel. In the context of 3G mobile phone networks the mobile station or mobile device is often referred to as a terminal and in this specification no distinction is drawn between these general terms.

One advantage of spread spectrum systems is that they are relatively insensitive to multipath fading. Multipath fading arises when a signal from a transmitter to a receiver takes two or more different paths and hence two or more versions of the signals arrive at the receiver at different times and interfere with one another. This typically produces a comb-like frequency response and, when a wide band signal is received over a multipath channel, the multiple delays give the multiple components of the received signal the appearance of tines of a rake. The number and position of multipath channels generally changes over time, particularly when the transmitter or receiver is moving. However, as the skilled person will understand, a correlator in a spread spectrum receiver will tend to lock onto one of the multipath components, normally the direct signal which is the strongest.

As is known in the art a plurality of correlators may be provided to allow the spread spectrum receiver to lock onto a corresponding plurality of separate multipath components of the received signal. Such a spread spectrum receiver is known as a rake receiver and the elements of the receiver comprising the correlators are often referred to as "fingers" of the rake receiver. The separate outputs from each finger of the rake receiver are combined to provide an improved signal to noise ratio (or bit error rate) generally either by weighting each output equally or by estimating weights which maximise the signal to noise ratio of the combined output. This latter technique is known as Maximal Ratio Combining (MRC).

There is a general need to provide user-end terminal capable of supporting the higher data rates possible in 3G systems, particularly in areas with large numbers of users. It is generally thought that a CDMA system is uplink-limited due to the near-far effect (where the correlation with a strong, nearby signal having an incorrect code is greater than that with a weaker, more distant signal with the correct code).

To facilitate the support of higher data rate services it is known to employ Multiple Access Interference (MAI) suppression at the base station to improve the uplink. Multiple access interference rises because the spreading codes of signals received from different users are not normally completely orthogonal. Interference cancellation (IC) receivers in the base station thus attempt to estimate a multiple access interference component which is subtracted from the received signal, either in parallel across all the users or sequentially. The multiple access interference which is cancelled is the interference between the same multipath component of two substantially orthogonal received signals. This technique is described in more detail in Section 11.5.2 of "WCDMA for UMTS by H Holma and A Toskala, John Wiley & Sons, 2001" (ISBN0 741 48687 6).

A technique for suppressing interference between different multipath components of a single data channel, that is for suppressing Interpath Self-interference (IPI), has also been described in a paper by NTT Docomo, "Multipath Interference Canceller (MPIC) for HSDPA and Effect of 64QAM Data Modulation" (TSG RAN WG)1 Meeting #18, document (01) 0102 available from the 3GPP website at http://www.3gpp.org/ftp/tsg_ran/wg1_rl1/tsgr1_18/docs/pdfs/r1-01-0102.pdf).

Intracell interference arises due to interpath interference and the loss of orthogonality between the channelisation codes. In an ideal environment with a single path between the transmitter and the receiver the OVSF channelisation codes ensure that the different transmitted streams are (substantially) orthogonal to one another. However in the presence of multipath time dispersion the non-zero auto (or cross) space-correlation between different multipath components gives rise to interpath interference.

Consider the case where a spread spectrum receiver receives two signals simultaneously, a first signal with a first spreading code of 1-11-1 and a second signal with a second spreading code of 11-1-1. These two spreading codes are substantially orthogonal over a symbol period as they sum to −1. However if the second code is offset slightly with respect to the first code the non-orthogonal component increases. Such an offset can be caused by multipath which effectively introduces a delayed component of both the first and second signals, albeit normally at a reduced power. Considering for example the first spreading code, a non-orthogonal contribution arises both from the delayed version of the first code, because of the non-ideal auto correlation properties of the codes, and also from the delayed version of the second code, because of the non-ideal cross-correlation properties of the codes.

The relatively poor correlation properties of OVSF codes when not time-aligned are known and this is the reason why an additional spreading code is applied in W-CDMA 3G systems. As explained above, the codes used in W-CDMA, as specified by the 3GPP, are Gold codes formed from position-wise modulo to summation of 38,400 chip segments of two binary m-sequences. The auto correlation-properties of an m sequence are illustrated in FIG. 3 in which the correlation function is shown on y axis 300. With a non-zero offset the maximum correlation output is proportional to the reciprocal of the spreading length, at −1/S where s is the spreading length. The spreading length is itself determined by the member of elements, n, in the shift register used to generate the code. The delay offset, T, between subsequent auto correlation peaks is given by the code length, S, multiplied by the chip period, $t_c$. With a large spreading factor 1/S will tend to zero and thus this code will approach the ideal characteristics of a zero auto correlation when not time-aligned. However at low spreading factors, which correspond to higher data rates, Interpath Interference (IPI) can become significant.

The capacity of CDMA systems is self-interference limited—that is the performance in terms of both capacity and quality of service, is determined to a large extent by the interference power arising from users within the same cell or in adjacent cells. It is therefore possible to improve the performance of CDMA systems by reducing this level of interference and there are a number of well known and accepted techniques for accomplishing this, including discontinuous transmission and the use of sectorised antennas. Interference within a cell can be mitigated to some degree based upon the recognition that signals from the base station to a terminal are synchronised and thus intra-cell MAI (Multiple Access Interference) can be mitigated by using codes which are orthogonal when aligned to within a chip period, such as the OVSF codes described above, or the Walsh codes used, for example, in IS95 (Interim Standard 95) CDMA phone networks in the USA. However in practice the time-dispersive nature of the mobile environment causes a significant loss of orthogonality, as described above, and a consequent increase in MAI. For example in a typical urban environment a loss of orthogonality of up to 40 percent may be observed. Inter-cell multiple access interference may also be observed.

The interference can be even greater on the uplink because the various mobile terminals communicating with the base station may not be time aligned, exacerbating the problem of multiple access interference. It is possible to improve the quality of service or capacity by reducing the level of this interference. There are a number of well-known and widely accepted techniques that reduce the level of this interference, such as discontinuous transmission and sectorised antennas.

As discussed, spreading codes that are orthogonal when aligned to a chip period (e.g. Walsh or OVSF codes) can be employed to minimise intra-cell multiple access interference (MAI). However, the codes ideal orthogonal properties only exist in a channel that exhibits no time dispersion and where the users are synchronised. In reality the time dispersive nature of the mobile environment and non-synchronous multi-user reception (particularly in the uplink configuration) can cause a significant loss of orthogonality and increase in MAI. In addition, inter-cell multiple access interference will also be observed.

On the uplink, as the base station (BS) will be receiving the desired and other users signals (non-synchronously), there will be an enormous level of interference from the other users. Unlike the downlink (DL) configuration, in the uplink the BS has the leverage of having a priori knowledge of all the users spreading sequences, thereby making it possible to remove (or suppress) the interference which the interfering users cause.

Such interference cancellation (IC) is described for example in US2002/0021682, and involves filtering each channel using its code (de-spreading) in order to determine its associated (or de-spread) symbol. The symbol is then re-coded (re-spread) in order to subtract this from the composite received signal, thus eliminating interference associated with that channel from the composite signal. The document further discloses a power control method which together with the interference cancellers can effectively increase the system capacity and make it resistant to sudden changes on the communication path. Also a power control method with a fast response is capable of preventing unnecessary increases in the transmission power (and multiple access interference) of the uplink by reflecting the values of the post-interference cancellation signal-to-interference power ratio in the generation of power control command information. A multiple access interference signal contained in a reception signal from the mobile station is cancelled, a post-interference cancellation signal-to-interference power ratio of the reception signal currently received is estimated, a power control command is generated by comparing the estimated post-interference cancellation signal-to-interference power ratio and a target value for power control, and transmitting this power control command to the mobile station to control the transmission power of the mobile station K. Rizvi, M. Fitton, Y. Chow, M. Ismail and Y. Bian, "Common Channel Interference Cancellation for a Spread Spectrum system", *IEEE VTC* 2004 *Spring*, May 2004 investigates advanced signal processing algorithms for existing and future wireless systems. This paper is focussed on evaluating the potential performance improvements that accrue from cancelling the common pilot channel's interference in terms of bit error rate performance for downlink applications. The impact of different cancellation strategies—sequential (SIC) and parallel (PIC)—is presented for various data rates and channel profiles. With the investigative analysis appertaining to the FDD element of the UTRAN specified by 3GPP, the performance of the interference cancellation unit is primarily based on the elimination of the cross-correlation of the spreading codes over time dispersive wireless conditions. With a sound channel estimate, the results are shown to achieve near interference free performance highlighting the potentiality of these interference cancellation schemes. Their versatility and robustness against channel estimation errors is further demonstrated by a relative performance comparison for a diversified range of data rates, pilot-to-data power ratios and channel conditions.

An alternative approach for the uplink attempts to improve performance by time aligning the mobile terminals T. Kawamura, H. Atarashi, and M. Sawahashi, "Adaptive Transmission Timing Control Using Reservation Packet in Reverse Link for DS-CDMA Broadband Wireless Access", *Technical report of IEICE, RCS*2003-141 (2003-10 proposes the Adaptive Transmission Timing Control (ATTC) describes a method of utilizing reservation packets for DS-CDMA in the uplink, in order to increase the link capacity while maintaining advantages such as one-cell frequency reuse in a cellular system in a multi-cell configuration. This method is illustrated in FIG. 2. The difference in the received reservation packet timing due to the propagation delay time is measured by utilizing the reservation packets that contain small amounts of information such as the data types, i.e., real time or non-realtime, and the size of the traffic bits in the packet data channel. The transmission timings of the successive packet data channels are controlled so that the received timings of the highest signal power path of the packet data channels of simultaneously accessing mobile terminals are aligned.

EP1039662 describes uplink and downlink communications which are coded with a spread spectrum sequence, and wherein the mobile terminals have different powers. At the base station, interference cancellation (IC) is performed in order to reduce the interfering effect of the highest power signals on the detected lowest power signals. In this method, at least for some of the most powerful interfering signals, groups of symbols of different interfering signals are time aligned when they reach the central station. Preferably, the synchronized groups of symbols are synchronously detected at the base station and are processed jointly prior to be subtracted from the signal to be detected.

Whilst these various methods improve performance, there is still a need for further improvement, especially for broadband channels.

SUMMARY OF THE INVENTION

In general terms the present invention provides a method of improving the performance of a CDMA based wireless network, such as a 3G cellular network for example. Interference cancellation is effectively performed earlier by using the channel request such as a reservation packet from a mobile terminal to estimate interference from that mobile on existing mobile users and interference on the mobile from existing mobile users, by determining the relative transmission timing of the new mobiles channel request compared with the transmission timings of the existing mobiles. This allows the base station to determine the cross-correlation between the codes already assigned to the existing users and the code to be allocated to the new user in order to determine an interference measure. This interference can then be cancelled from the new mobile when its data packets are received.

By calculating the cross-correlation whilst the mobile is being informed of its code, this reduces delay in calculating the interference estimates when receiving data from the mobile, and hence improves latency. Additionally, because the mobiles are allowed to transmit using their own relative timing rather than being forced to align their transmission timing with other mobiles, there is no delay involved in this time alignment, the mobile being able to transmit straight after having received an acknowledgement (and its assigned code) from the base station. This also reduces latency in the system. A further advantage is that the signalling overhead is reduced as there is no requirement to forward a transmission timing shift command to the new mobile.

In particular in one aspect the present invention provides a CDMA based wireless base station comprising:
    means for receiving a channel request from a mobile terminal;
    means for sending an acknowledgement including an assigned code to the mobile terminal;
    means for determining the relative transmission timing of the mobile terminal;
    means for determining a cross-correlation parameter associated with the requesting mobile terminal code and transmission timing and another mobile terminal communicating with the base station and having another code and transmission timing;
    means for receiving data from the requesting mobile terminal using said assigned code and transmission timing;
    means for cancelling interference on said received data caused by data received from said other mobile terminal on said other code and other transmission timing, said interference cancellation using the cross-correlation parameter.

By calculating the cross-correlation between the two mobile terminals based on their relative transmission timings and assigned codes prior to receiving data from the new mobile terminal, latency in the base station is reduced. In a typical application, the channel request comprises a reservation packet, and this is used to determine the relative transmission timing of the requesting terminal. The code is assigned by the base station as is known.

The auto-correlation of the mobile terminal is also determined using the assigned code in order to detect the data from the new mobile terminal as is known.

Preferably an initial channel estimate for the data is based on a channel estimate determined from the reservation packet. This also reduces latency by performing the channel estimation calculations whilst the mobile terminal is being informed of its code assignment. The channel estimate may be improved by utilising the actual data received once the code has been allocated.

In general terms in another aspect the present invention provides a method of improving the performance of a wireless network, such as a 3G cellular network for example. Channel estimation is effectively performed earlier by using the channel request such as a reservation packet from a mobile terminal to estimate the channel from that mobile. Thus while the mobile is being informed that it can start transmitting on a particular channel, the base station can perform preliminary channel equalisation calculations such as estimating the channel and calculating and channel equalisation function.

By calculating the channel estimate (and the channel correction or equalisation function) whilst the mobile is being informed of its code, this reduces the delay that would otherwise occur in calculating these functions when receiving data from the mobile, and hence this improves latency.

Because there is no time alignment or synchronisation of the transmission timings of the mobile terminals, there is no delay involved in this time alignment, and therefore the mobiles are able to transmit straight after having received an acknowledgement (and its assigned channel) from the base station. This also reduces latency in the system. A further advantage is that the signalling overhead is reduced as there is no requirement to forward a transmission timing shift command to the new mobile.

Whilst the preferred wireless communications system is for the application of this method is CDMA based, it is also applicable to TDMA based systems such as GSM, or FDMA systems.

In particular in one aspect the present invention provides a wireless base station comprising: means for receiving a channel request from a mobile terminal; means for sending an acknowledgement including an assigned channel to the mobile terminal; means for determining an initial channel estimate for the mobile terminal based on the channel request; means for receiving data from the requesting mobile terminal using said assigned code and said initial channel estimate.

Preferably the cross-correlation between two CDMA based channels is also determined using the channel/code allocations by the base station and the relative transmission timings of the mobiles devices accessing the base station based on the reservation packets. This further improves the reduced latency effect.

Whilst channel estimate and cross-correlation parameter determination can be performed separately based on the reservation packet or channel request of a new mobile terminal, advantageously there are both performed using the channel request such that these parameters have already been calculated by the time data packets are received by the mobile terminal.

BRIEF DESCRIPTION OF THE DRAWINGS

Embodiments are described with reference to the following drawings, by way of example only and without intending to be limiting, in which.

DETAILED DESCRIPTION

As discussed above, in a cellular configuration using CDMA as a multiple access scheme, users exist in the same frequency spectrum at the same time, and are delineated by a unique spreading code. Consequently, the capacity of CDMA systems is said to be self-interference limited, which is to say that performance (both capacity and quality-of-service) is determined by the interference power arising from users within the same cell or in adjacent cells.

Figure 3:
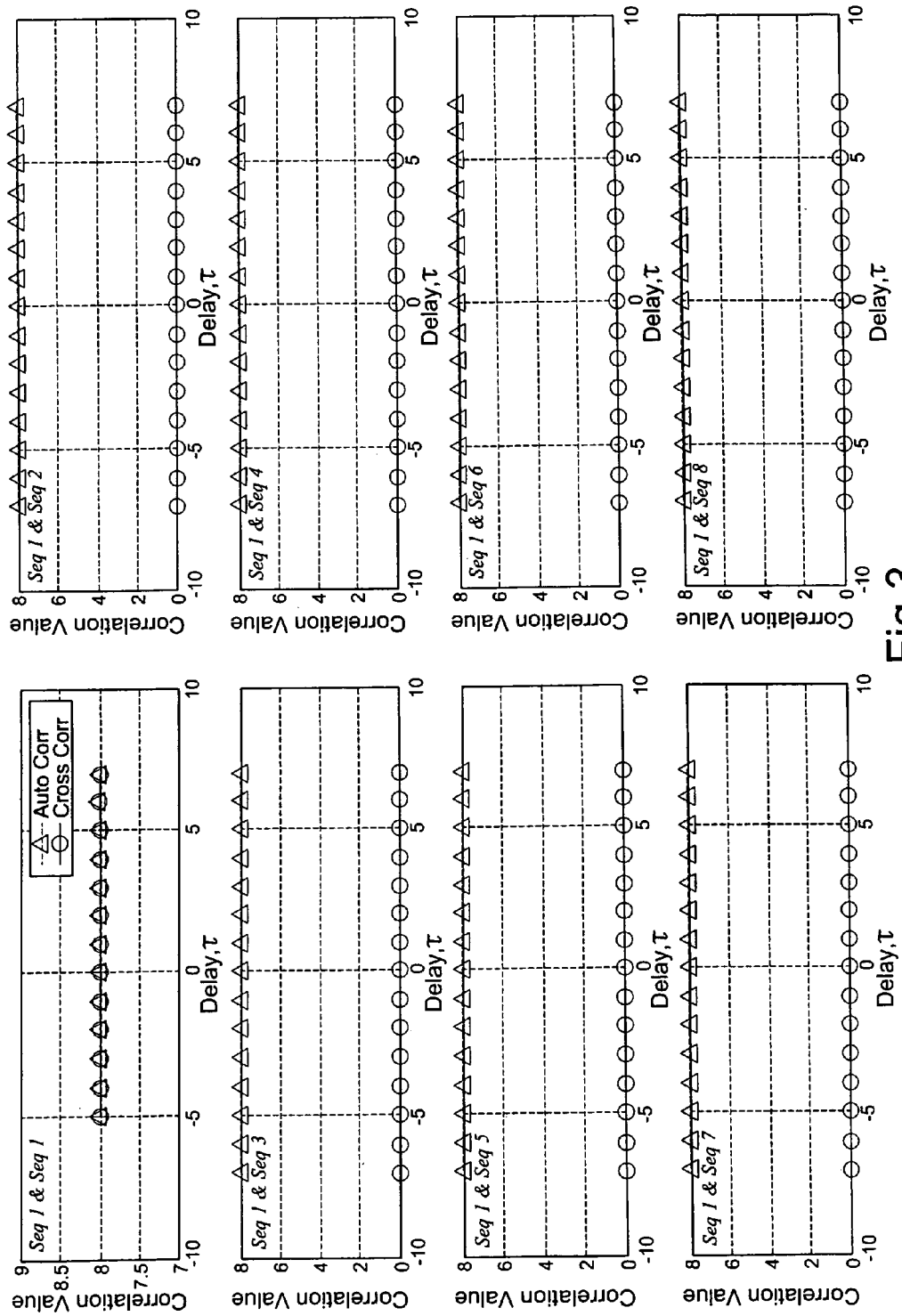
FIG. 3 illustrates correlation plots of OVSF code sequence 1 with sequences 1 to 8.

The use of orthogonal variable spreading factor (OVSF) codes in an ideal environment with synchronised users and single path channel profile between transmitter and receiver ensures that the different transmitted streams are orthogonal to each other as illustrated in FIG. 3. However with asynchronous reception from multiple users, the non-zero cross-correlation between different users gives rise to interference due to the loss of orthogonality.

Figure 4:
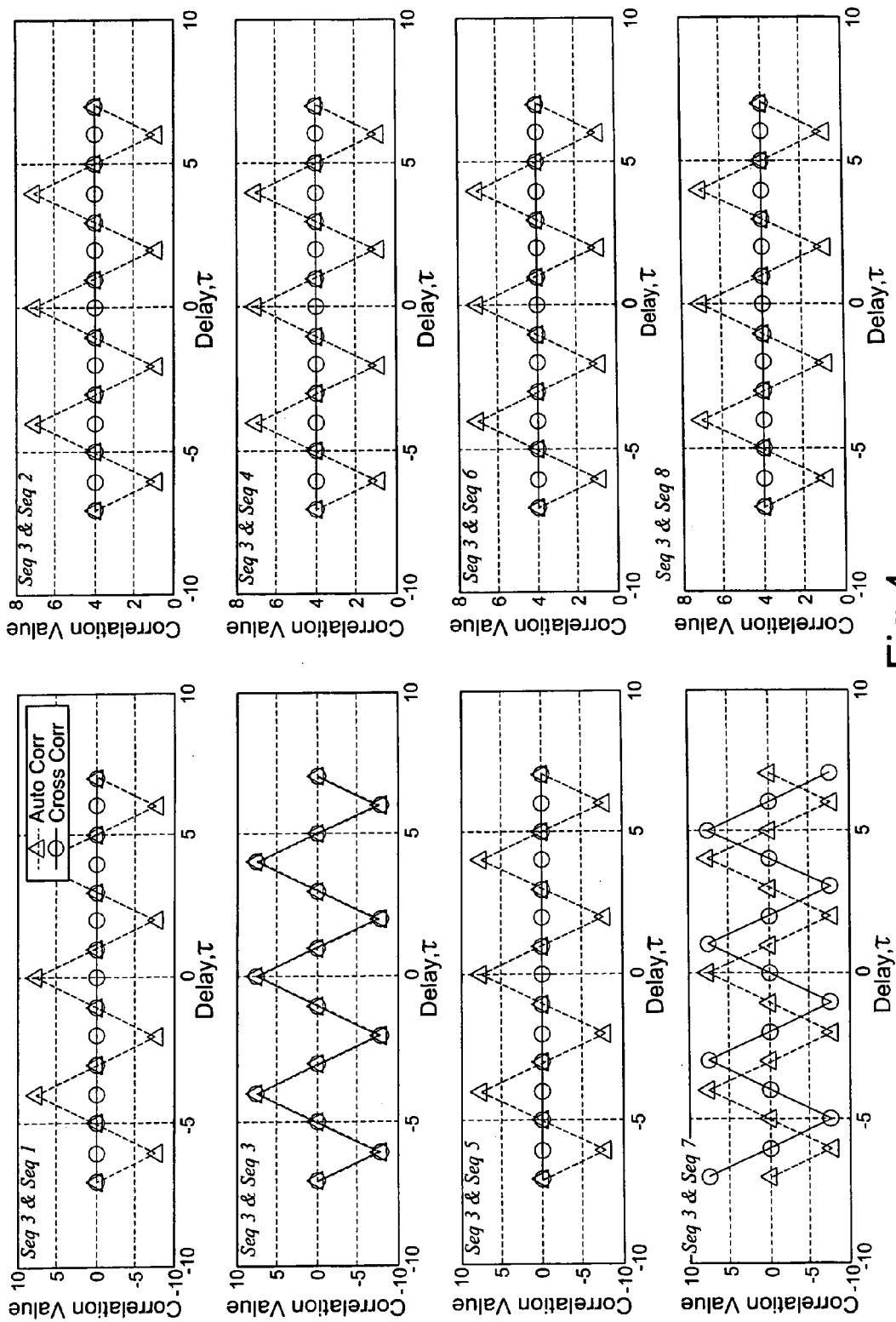
FIG. 4 illustrates correlation plots of OVSF code sequence 3 with sequences 1 to 8.
Figure 5:
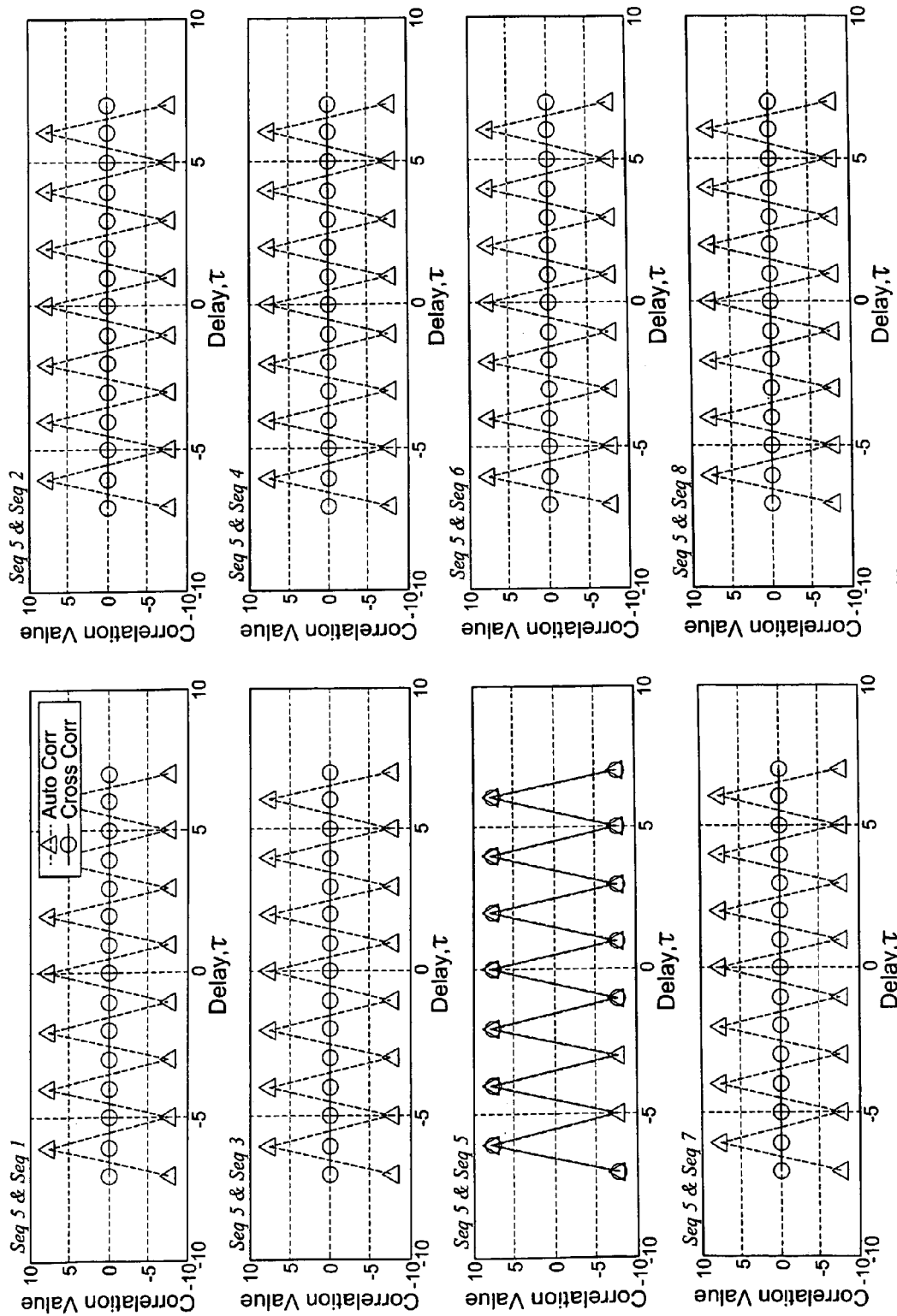
FIG. 5 illustrates correlation plots of OVSF code sequence 5 with sequences 1 to 8.
Figure 6:
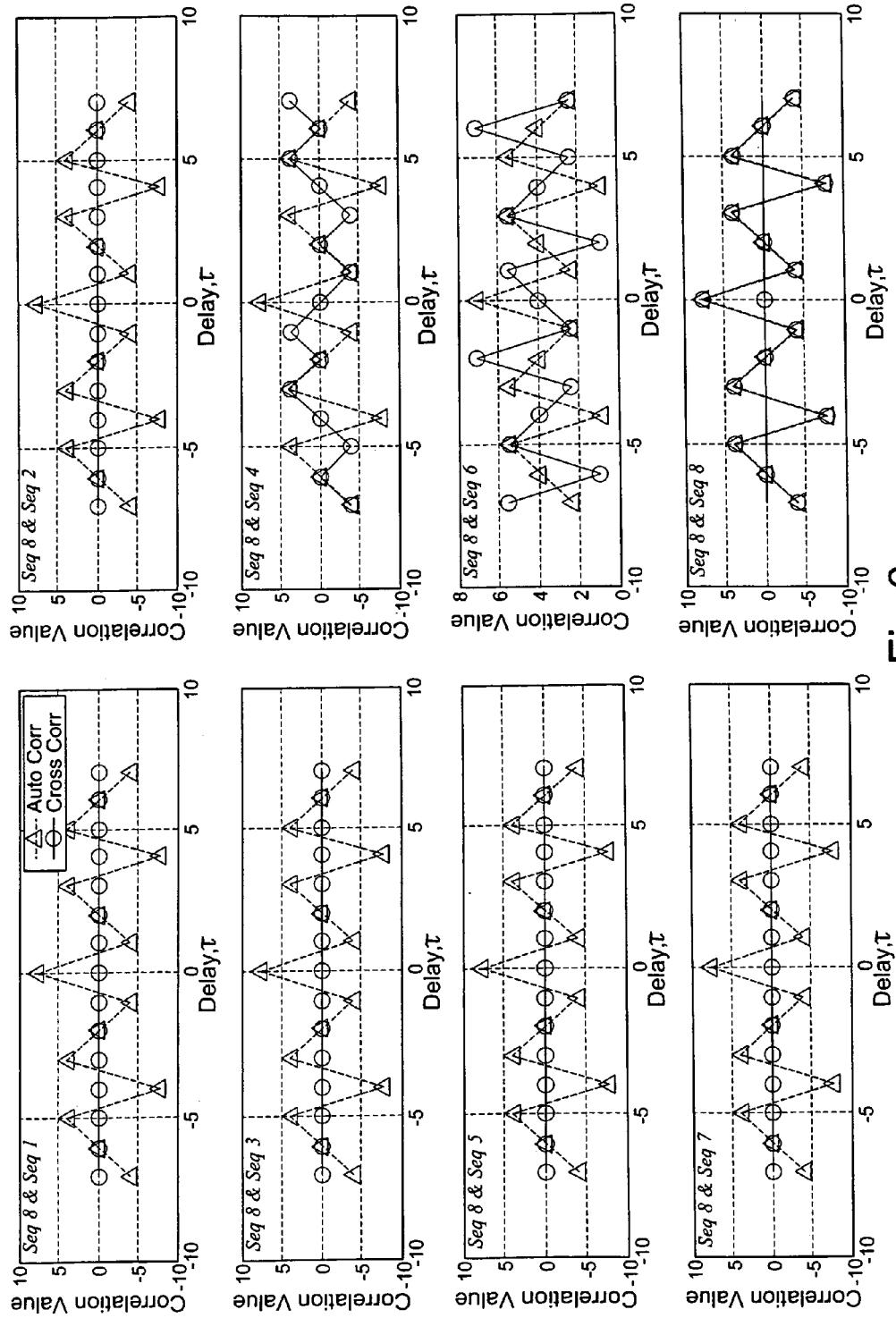
FIG. 6 illustrates correlation plots of OVSF code sequence 8 with sequences 1 to 8.

FIGS. 4, 5 and 6 show cross-correlation plots of OVSF codes of length 8. The following sets of sequences will be available:

| | | | | | | | | |
|---|---|---|---|---|---|---|---|---|
| Seq 1 = | 1 | 1 | 1 | 1 | 1 | 1 | 1 | 1 |
| Seq 2 = | 1 | 1 | 1 | 1 | −1 | −1 | −1 | −1 |
| Seq 3 = | 1 | 1 | −1 | −1 | 1 | 1 | −1 | −1 |
| Seq 4 = | 1 | 1 | −1 | −1 | −1 | −1 | 1 | 1 |
| Seq 5 = | 1 | −1 | 1 | −1 | 1 | −1 | 1 | −1 |
| Seq 6 = | 1 | −1 | 1 | −1 | −1 | 1 | −1 | 1 |
| Seq 7 = | 1 | −1 | −1 | 1 | 1 | −1 | −1 | 1 |
| Seq 8 = | 1 | −1 | −1 | 1 | −1 | 1 | 1 | −1 |

FIG. 4 highlights that Seq 3 has multiple peaks for its auto-correlation function and it's cross-correlation with Seq 7 gives an enormously high value. FIG. 5 addresses the cross-correlation concerns with Seq 5 being chosen, and FIG. 6 shows that for the user being assigned Seq 8, the auto-correlation impediment will be resolved but the cross-correlation values are aggravated.

The correlation plots illustrated will change when the same set of spreading sequences are coupled with scrambling sequences (normally added for BS identification purposes). However for simplicity this is not illustrated.

It can be seen that for known OVSF spreading sequences and a known time reception difference T, cross-correlation and auto-correlation parameters can be determined for pairs of sequences. When these sequences are assigned to mobile terminals communicating with a bas station, it can be seen that cross-correlation parameters between two mobile terminals can be determined using these known sequence relationships and the relative timings of the mobile terminal signals.

Turning now to M-sequence codes, in a multiple access (MA) spread spectrum system using degree 5 primitive polynominals, some of the primitive polynomials are as follows:

$$f_1(x)=x^5+x^2+1$$

$$f_4(x)=x^5+x^3+1$$

$$f_6(x)=x^5+x^4+x^3+x+1$$

The spreading sequences for the aforementioned polynomials are detailed below.

| | | | | | | | | | |
|---|---|---|---|---|---|---|---|---|---|
| $f_1(x) =$ | −1 | −1 | −1 | −1 | 1 | −1 | 1 | −1 | 1 |
| | 1 | 1 | −1 | 1 | 1 | −1 | −1 | −1 | 1 |
| | 1 | 1 | 1 | 1 | −1 | −1 | 1 | 1 | −1 |
| | 1 | −1 | −1 | 1 | | | | | |
| $f_4(x) =$ | −1 | −1 | −1 | −1 | 1 | −1 | −1 | 1 | −1 |
| | 1 | 1 | −1 | −1 | 1 | 1 | 1 | 1 | 1 |
| | −1 | −1 | −1 | 1 | −1 | 1 | 1 | 1 | 1 |
| | −1 | 1 | −1 | 1 | | | | | |
| $f_6(x) =$ | −1 | −1 | −1 | −1 | 1 | 1 | 1 | −1 | −1 |
| | 1 | 1 | −1 | 1 | 1 | 1 | 1 | 1 | −1 |
| | 1 | −1 | −1 | −1 | 1 | −1 | −1 | 1 | −1 |
| | 1 | −1 | 1 | 1 | | | | | |

Figure 7:
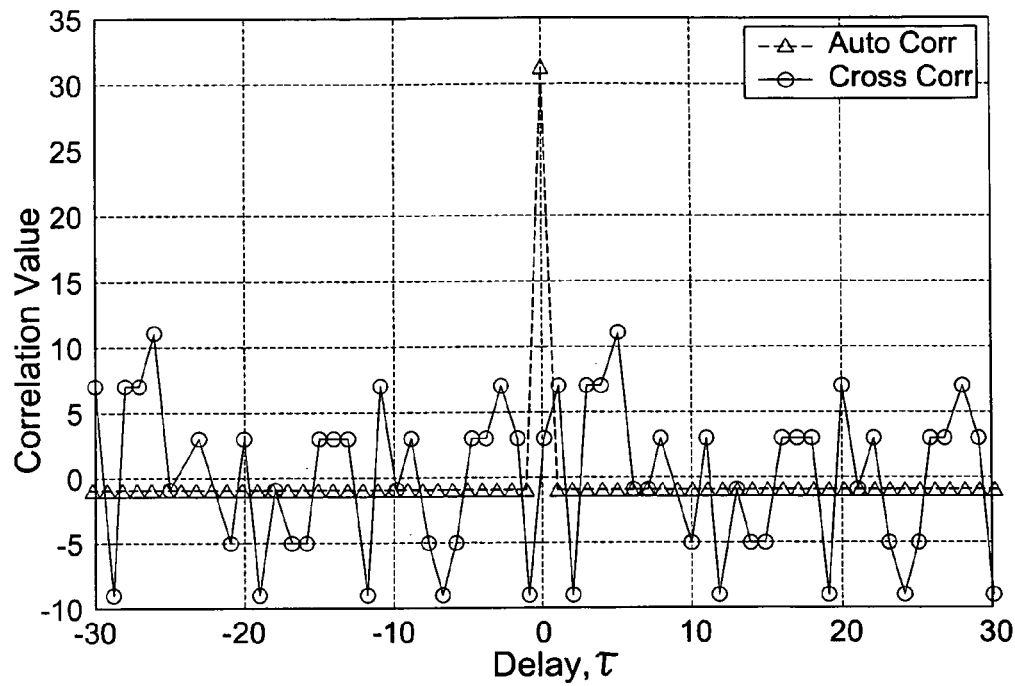
FIG. 7 illustrates correlation plots of M-Seq, using degree 5 polynomials ($f_4(X)^2$ and $f_1(X)^2$)

As can be seen from FIG. 7, the cross-correlation function has a cross-correlation peak of 11, which is considered "high" in comparison with the auto-correlation peak of 31. One of the major disadvantages, other than introducing MAI, is that if the user with the PN generator function $f_1(x)$ is searching its code in a MA communications system, its receiver might be triggered by a false synchronisation indication due to the relatively high degree of cross-correlation with PN generator $f_4(x)$.

Figure 8:
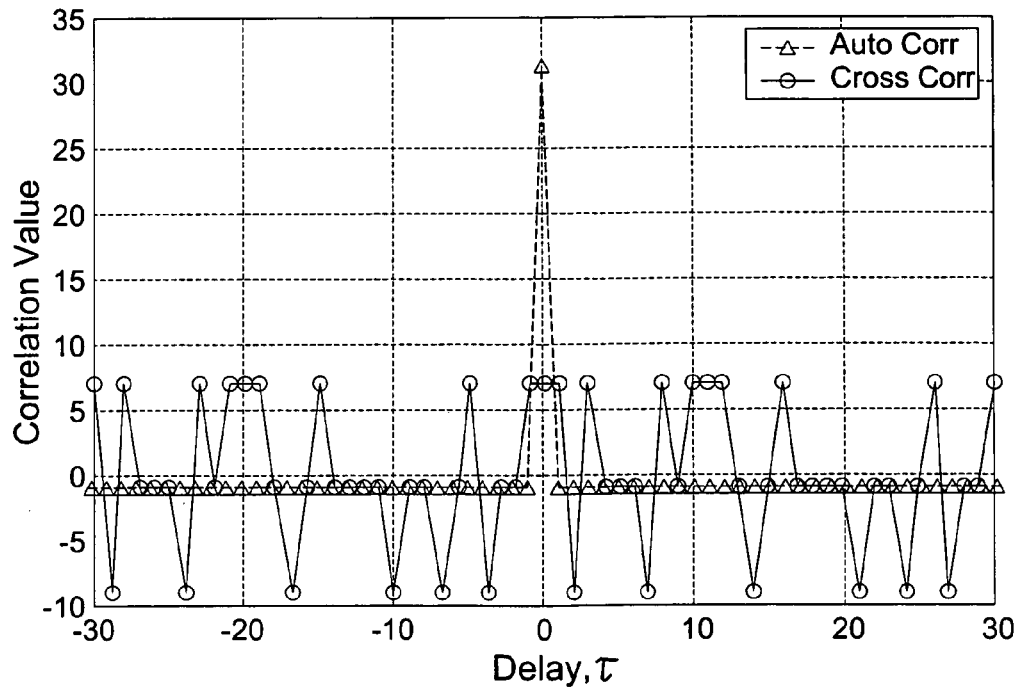
FIG. 8 illustrates correlation plots of M-Seq, using degree 5 polynomials ($f_4(X)^2$ and $f_6(X)^2$)

From FIG. 8, it can be seen that cross-correlation peaks for certain pairs of m-sequences will give a relatively reduced level of cross-correlation than others, but nevertheless will adversely impact the system capacity and performance even when the sequences are time aligned.

However as with the OVSF codes, the cross-correlation parameters or values can be determined in advance given knowledge of the codes themselves and determination of the relative signal reception timings of the mobiles using these codes. These parameters can then be used for interference cancellation and/or multi-user detection (MUD) purposes.

Figures 9A, 9B:
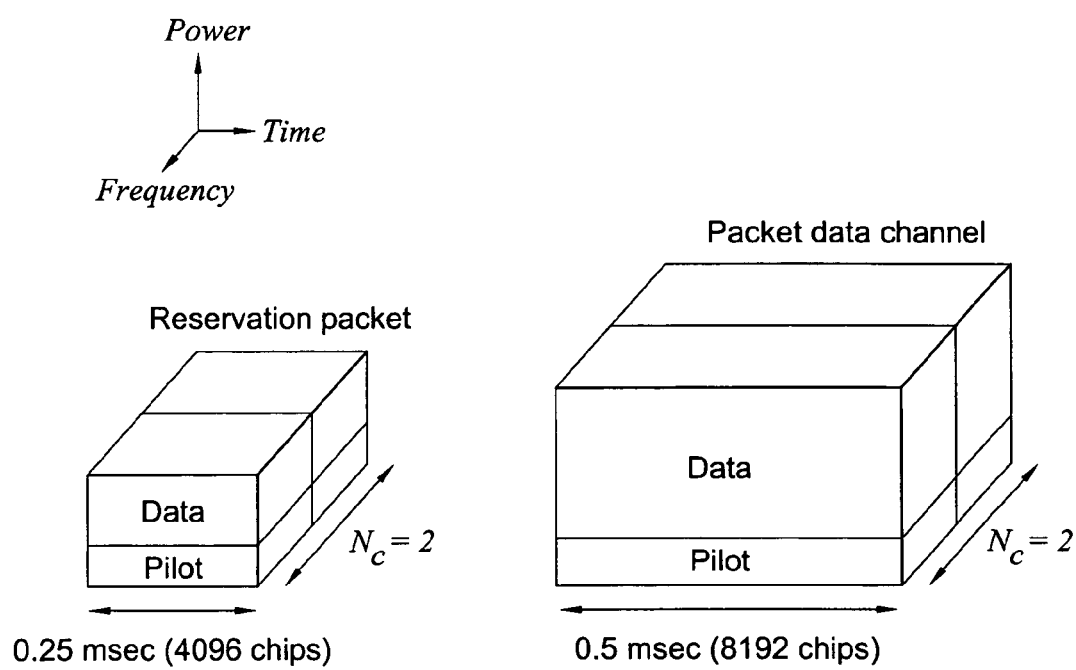
FIGS. 9a and 9b illustrate a reservation packet and a data packet respectively.

Referring now to FIGS. 9a and 9b, reservation and data packets for 3G uplink are shown respectively. A mobile wanting to "connect" to a base station, or being asked to receive a call by an in-range base station forwards a reservation packet to the base station on a known control channel as is known. Pilot Signal and Control Information Data is transmitted on the Reservation Packet. The base station will allocate or assign the requesting base station an unused code which is "orthogonal" (at least in ideal circumstances) to codes used by other mobile stations communicating with the same base station.

However because of multi-path effects, different distances between the different mobiles, and lack of synchronisation between the mobiles, the signals will arrive too some extent asynchronously resulting in loss of orthogonality. This in turn results in multiple access interference (MAI). The lack of synchronisation between the mobile terminals results in them transmitting their signals at slightly different times so that they overlap in an interfering way. This later cause of MAI can be mitigated by interference cancellation according to the following embodiment.

Figure 10:
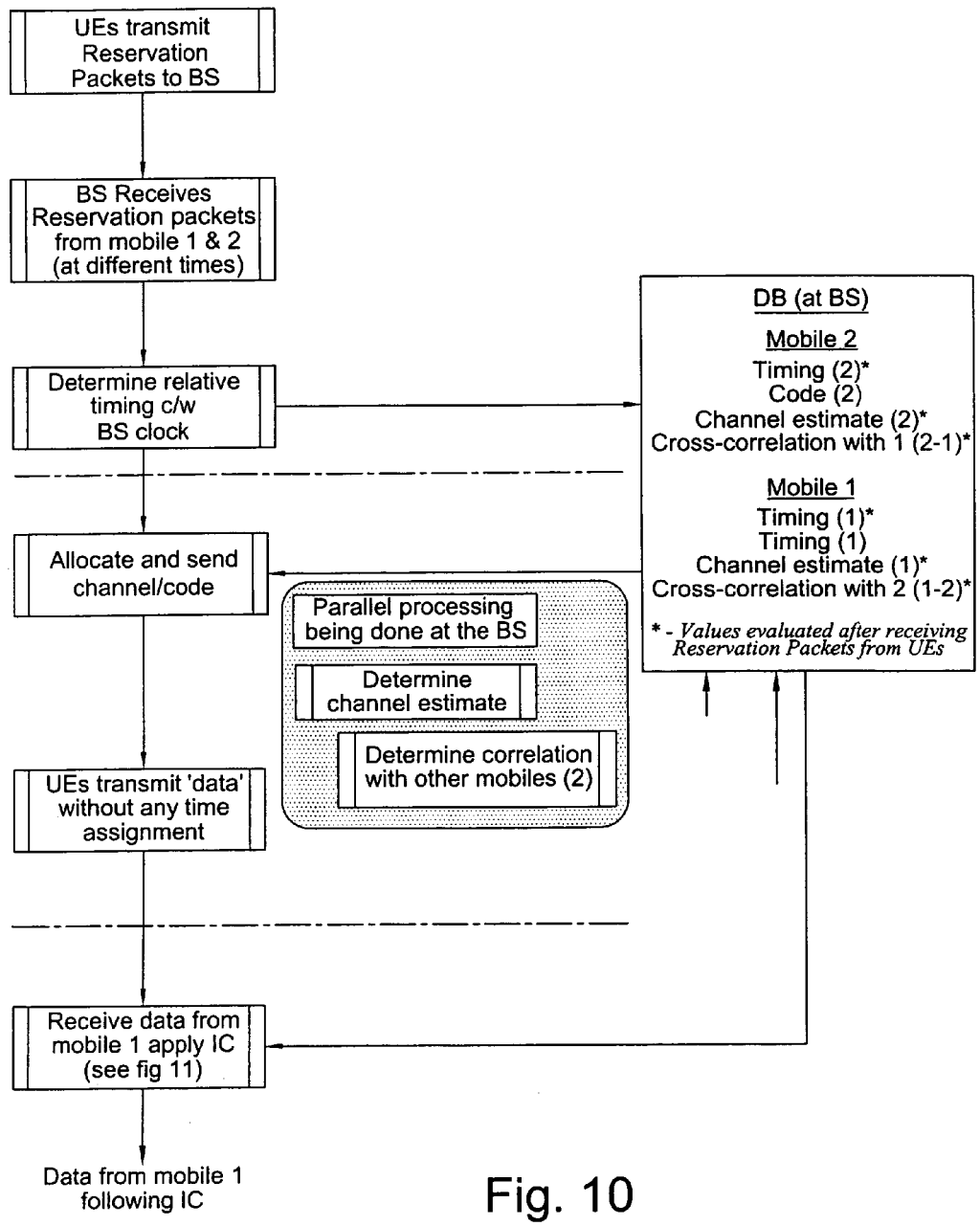
FIG. 10 illustrates a method of operating a base station according to an embodiment in order to reduce MAI.
Figure 11:
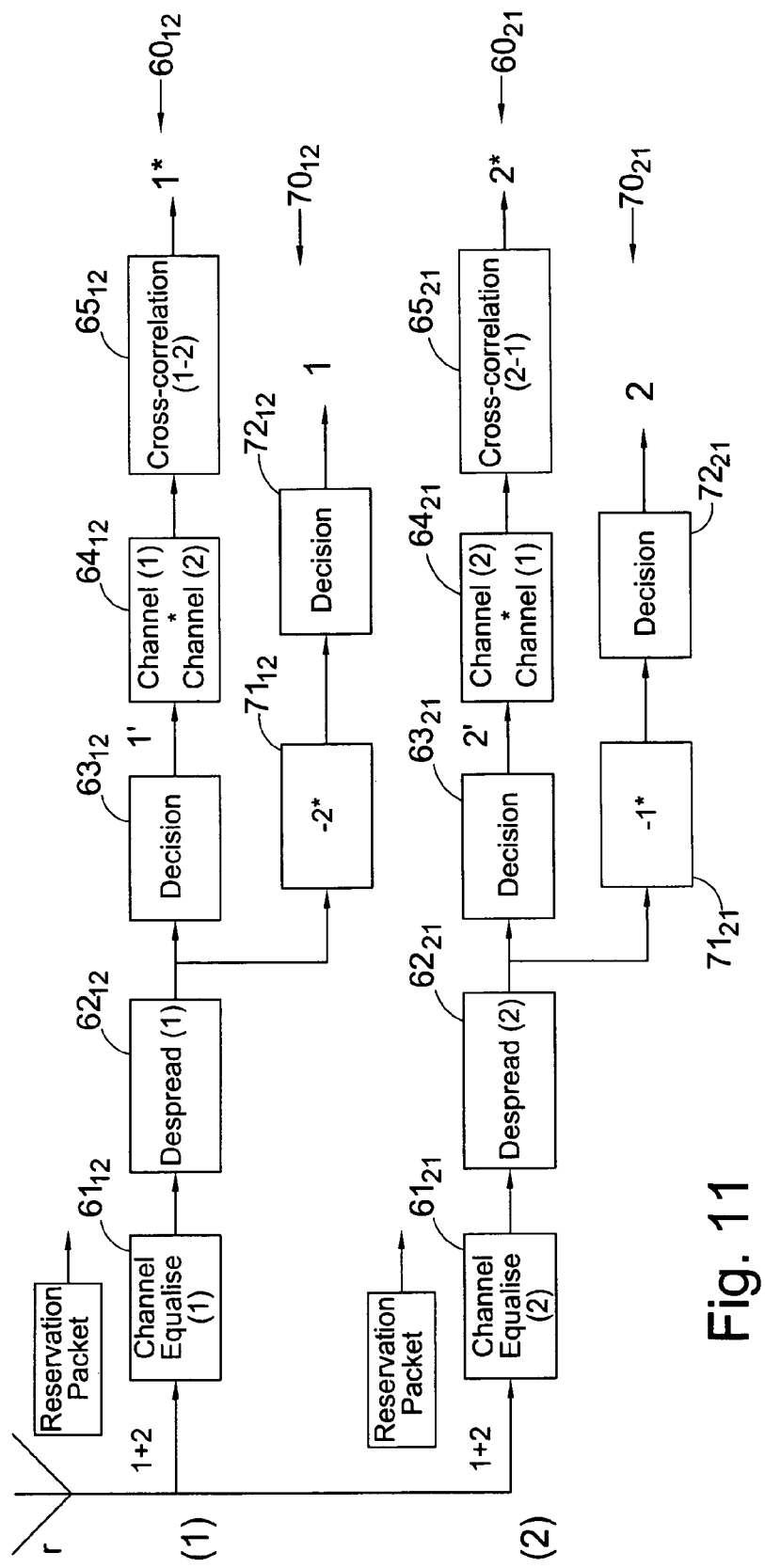
FIG. 11 illustrates part of a base station architecture for interference cancelling according to an embodiment.

FIG. 10 illustrates a method of operating a base station according to an embodiment and which is communicating with a number of mobile terminals. FIG. 11 illustrates an architecture for interference cancellation within a base station according to an embodiment. Each mobile terminal will be assigned a code (typically OVSF or M-seq) for up-link communication (ie terminal to base station) and which is orthogonal with the other mobile codes. With knowledge of the relative reception timings of each terminal signal and its allocated code, cross-correlation parameters can be determined for each pair of codes/signals between two mobile terminals. These parameters can then be used to cancel at least the part of the MAI resulting from lack of synchronisation between the mobile signals.

For simplicity, only two mobile terminals 1 and 2 are considered in FIGS. 10 and 11. The base station receives reservation packets (see FIG. 9a) from the new mobile terminals 1 and 2. Using the received times of the respective reservation packets from the requesting mobile terminals 1 and 2, the base station determines their relative timing with respect to its own internal clock. The mechanism for determining the relative timing is well known to those in the art. For example auto-correlation peaks can be used.

The relative timing (timing_1) of mobile terminal 1 is then stored in a base station database (DB) for associated mobiles terminals. The base station BS then determines whether it has any spare channels, and if so allocates an associated code (code_1) to the requesting mobile 1. This is also retained in the database and associated with the requesting mobile terminal's record. The assigned code (code_1) is forwarded together with a "request granted" indication to the second mobile 1. The relative timing (timing_2) of the second requesting mobile terminal 2 is then stored in a base station database (DB) for associated mobiles terminals. The base station BS then determines whether it has any spare channels, and if so allocates an associated code (code_2) to the requesting mobile 2. This is also retained in the database and associated with the requesting mobile terminal's record. The assigned code (code_2) is forwarded together with a "request granted" indication to the second mobile 2.

The signalling to the new mobile terminals 1 and 2 is of the ACK/NACK form of control signal authorising the transmission of the mobile's data (assuming the channel/code resources are available with the BS). If the number of channels available with the BS is less than the number of users simultaneously requesting transmission, then there will be a denial of service to some of the users. The requesting mobiles 1 and 2 are then able to forward data packets to the base station on their respective allocated channels (code_1 and code_2).

Instead of having to time align the data, each one of the requesting mobiles can instantaneously transmit upon the reception of an ACK signal from the BS (this assumes that there is no detection error of ACK/NACK signalling).

Meanwhile, the base station determines a channel estimate for the mobiles 1 and 2 based on their respective received (and known) reservation packets. The base station also determines a cross-correlation parameter for the two mobile terminals 1 and 2, based on their respective codes (code_1 and code_2) and their respective timings (timing_1 and timing_2). This can be achieved using the above described correlation plots for OVSF or M-seq (or other types of spreading code) as appropriate. This may be implemented as look-up tables for example.

Thus the base station should have determined the channel estimate for the requesting mobile stations 1 and 2, together with their respective cross-correlation parameters with respect to each other. The base station then receives data packets from the new mobile stations 1 and 2, which are coded using their respective allocated codes (code_1 and code_2) and according to their own relative transmission timing.

The base station can then perform an interference cancellation to remove the interference component associated with data packets received from the other mobile terminal 1. An example interference cancellation technique is described in more detail below with respect to FIG. 11.

It can be seen that there is no requirement for the new mobile terminal to have its transmission timing aligned with the rest of the system, as the interference cancellation procedure removes interference associated with this misalignment of timing. This results in lower latency in getting the new terminal communicating data packets because there is no additional time-alignment step. This also reduces the signalling overhead in getting the new mobile terminal communicating as there is no need to forward details on the time alignment. However even without this time alignment step, interference resulting from the lack of synchronisation is removed using interference cancellation, based on the above described cross-correlation parameters.

Referring now to FIG. 11, an interference calculation and cancellation processing architecture 50 for the uplink at the base station is shown. For simplicity only two mobile terminal processing blocks are shown. Each mobile terminal is associated with an interference calculation processing chain (upper) 60 which determines the component of interference in a received signal (reservation packet 51) that is due to that mobile; and an interference cancellation processing chain (lower) 70 which removes the interference component in the received signal (data packet 52) due to the other mobile terminal(s). It can be seen that each mobile will be associated with an interference calculation chain 60 for each other mobile, and that each mobile will require an interference cancellation chain 70 for each other mobile.

Each processing chain receives a combined received signal r which includes reservation 51 and data 52 packets from the requesting mobiles 1 and 2 respectively. In order to determine the interference component of this signal for mobile 2 and due to mobile 1 (the top chain), first the channel estimate for mobile 1 is calculated as is known using the reservation packet. An inverse channel or other channel equalising function is then calculated and applied to the received signal (1+2). This processing is performed by a channel equalisation block $61_{12}$. Next the channel equalised received signal is de-spread by a despread processing block $62_{12}$ using the code for mobile 1 as is known, in order to get the baseband reservation packet from mobile 1. A decision processing block $63_{12}$ is then used to detect or determine the symbol (1') transmitted. This will include some interference from the other mobile 2. Once this has been detected, the relative timing for the mobile 1 is determined so that the cross-correlation with mobile 2 can be determined, as illustrated in FIG. 10. The detected symbol is then multiplied by the channel estimates for both mobile 1 and mobile 2 at processing block $64_{12}$, and finally is multiplied by the calculated cross-correlation parameter at processing block $65_{12}$ in order to get the interfering component (1*) of the received signal caused by mobile 1.

In order to perform the interference cancellation on the received signal for the second mobile 2, this signal is first channel equalised for mobile 2 at processing block $61_{21}$, then de-spread at processing block $62_{21}$. The interfering component (1*) from mobile 1 is then subtracted from this signal at processing block $71_{21}$, in order to get just the signal associated with mobile 2. A decision block $72_{21}$ is then used to detect an improved accuracy signal (2) from the mobile 2.

A corresponding process is used to first calculate the interfering component from mobile 2 effecting mobile 1, and this is then subtracted from the received signal in order to determined an improved estimate for the signal from mobile 1.

A mathematical explanation of this arrangement follows:

Assumptions

Let the received signal at the BS from the 2 mobiles=r
Let the data signal transmitted from mobile #1=d1
Let the spreading sequence for mobile #1=s1
Let the channel response for mobile #1=c1
Let the data signal transmitted from mobile #2=d2
Let the spreading sequence for mobile #2=s2
Let the channel response for mobile #2=c2

Calculations

Signal received at BS from mobile #1=(d1*s1)*c1
Signal received at BS from mobile #2=(d2*s2)*c2
Total signal received at the BS from mobile #1 & mobile #2=r=(d1*s1)*c1+(d2*s2)*c2

Figure 1:
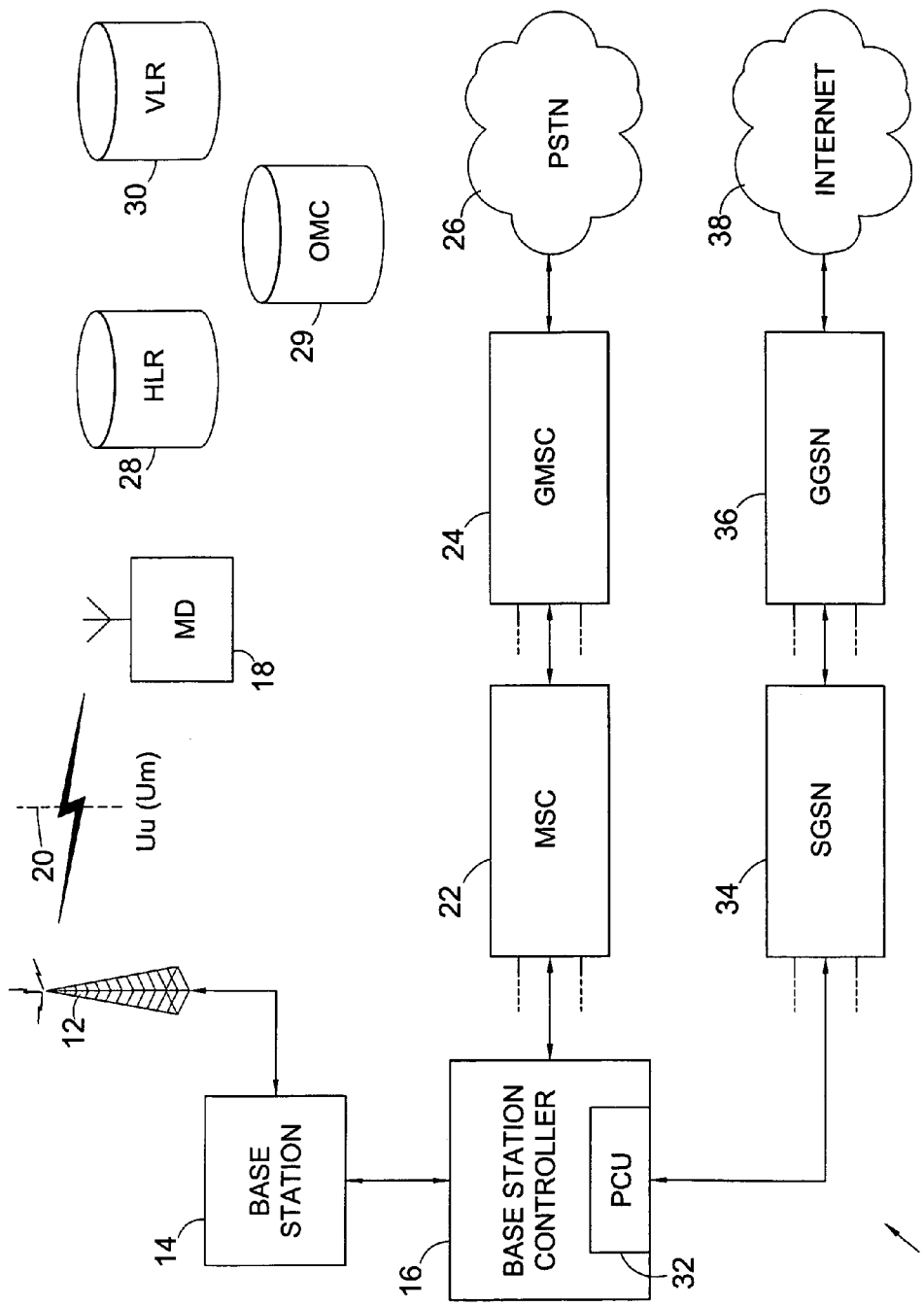
FIG. 1 illustrates a 3G network architecture.

FIG. 11-1 down ($1^{st}$ chain)—Interference Calculation chain for mobile #1

After Channel Equlise (1)

$r*c1(conj^1)=(d1*s1)*|c1|^2+(d2*s2)*(c2*c1(conj))$ where conj is the complex conjugate for a complex value
After Despread (1)

$r*c1(conj)*s1(conj)=(d1)*|s1|^2*|c1|^2+(d2)*(s2*s1(conj))*(c2*c1(conj))$

Figure 2:
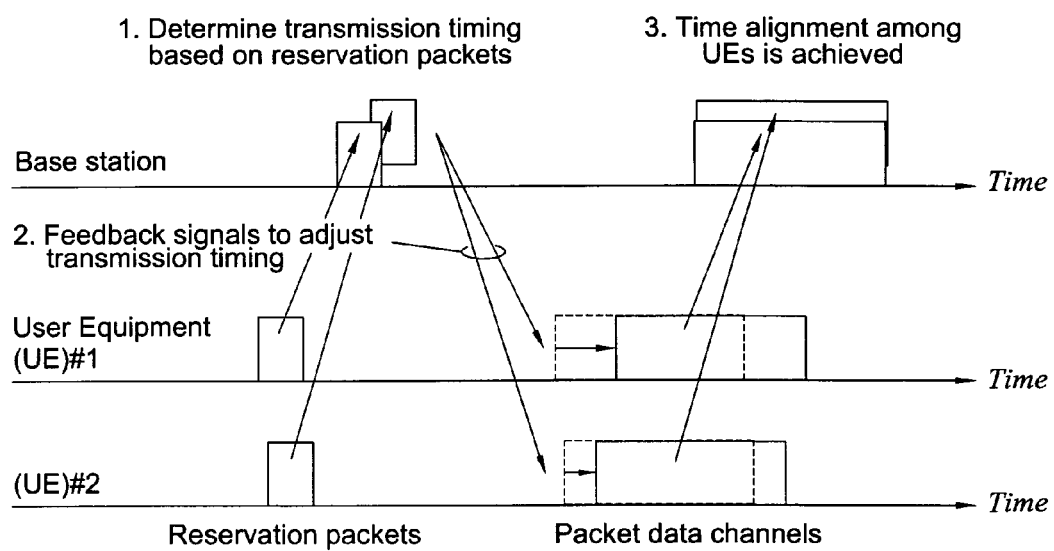
FIG. 2 illustrates a known method of reducing MAI.

FIG. 11-2 down (2nd chain)—Interference Cancellation chain for mobile #1

We need the following factors to be subtracted for recovering d1 (with $|s1|^2$ and $|c1|^2$ being scalars):

$(d2)*(s2*s1(conj))*(c2*c1(conj))$ hence, in FIG. 11-3 down ($3^{rd}$ chain)—Interference Calculation chain for mobile #2, the blocks are computing the following:

$(s2*s1(conj))$=Cross-correlation b/w spreading sequence of mobile #1 & mobile #2

$(c2*c1(conj))$=Product of channel response for mobile #1 & mobile #2

Other types of cancellation/suppression schemes could alternatively be used which utilise the relative timing determined from the reservation packet and the cross-correlation parameter determined from respective codes. In the case of the mobile user terminals, the mobile transmit power would typically be only 1 W or less, which would reduce the maximum acceptable propagation loss and limit the range of the system, making the system uplink limited. Of the number of schemes and implementation methods for multi-user detection (MUD) like Maximum Likelihood (ML), Decorrelator, Minimum Mean Squared Error (MMSE), Decision Feedback Detectors, Multistage Detectors, some of the cancellation-suppression based schemes are briefly outlined below.

There are a number of interference cancellation (IC) schemes that have been previously introduced to enhance the bit error rate (BER) performance in the presence of simultaneous users in a DS-CDMA communication systems. Various examples of successive interference cancellation (SIC) and the parallel interference cancellation (PIC) schemes have been extensively investigated and well documented at K. Rizvi, M. Fitton, Y. Chow, M. Ismail and Y. Bian, "Common Channel Interference Cancellation for a Spread Spectrum system", *IEEE VTC* 2004 *Spring*, May 2004, and patent document GB2384665.

Further capacity enhancements can be made by performing muticode cancellation and STTD (space time transmit diversity) IC in appropriate systems. Another improvement that can be implemented in the BS receiver is diversity gain. However this will successively enhance the level of processing complexity at an additional receiver data stream. However, the IC schemes can still be extended to a receive diversity system model for enhancing the system performance, which can be applied in either of the two formats: Pre-combining or Post-combining as is known.

Applying interference cancellation to the received signal using reservation packets will remove the interference that will be contributed as a result of these non-time aligned sequences. This is based on the assumption that timing delay offset, evaluated based on the Reservation Packet requests, is maintained during the round trip interval. Even in the case of alteration of the timing delay offset during the round trip interval (which is quite an unlikely possibility), the previous delay information (based on the Reservation packets) can still be used to assist. Thus some relative offset value for code tracking can be implemented in the re-evaluation of the updated delay offset by the BS.

In summary then, the BS transmits an acknowledgement signal to the new mobile user instead of transmit timing adjustment information as is used in some known systems. The number of bits required to convert an acknowledgment is less than for timing adjustment information. Hence this will reduce the overhead at the downlink transmission. Furthermore, timing adjustment information needs to be quantised before transmission, since only limited number of bits is used in practice for transmission. This quantisation will affect the accuracy of the timing alignment of the received data packets, and hence the effective interference cancellation. Since the new mobile does not need to adjust its transmission time, this simplifies its transmission process. Overall transmission delay can be reduced.

In an alternative embodiment, instead of (or additionally to) using the reservation packet to calculate the cross-correlation parameters between the various mobile channels, it is used to calculate an initial channel estimate for each respective mobile. This allows the complex and time consuming channel estimate calculation to have already been performed by the time the base station is receiving the first data packets from the new mobile. The channel estimate determined from the reservation packet is then used (at least initially) to recover the data packets.

Two modes of operation are outlined below. Reservation packet aided channel estimate uses only the channel estimate formed from the Reservation Packet, and uses the same estimate whilst the mobile terminal (UE) is transmitting (data packets) on a dedicated physical channel. This is less complex, but may have a poor estimate for the channel in a fast moving environment (or if coherence time is exceeded), as the accuracy of this scheme is dependant on the round trip interval. Also this estimation does not take into account the interference arising from other users.

The second mode is Reservation packet and Dedicated channel aided channel estimate, in which the channel estimation is calculated from the Reservation Packets, then subtracted, and then a revised (and hopefully better) channel estimate based on Dedicated physical channel can be formed. This has the overhead of a higher level of complexity, but will be able to track rapid channel variations.

Figure 12:
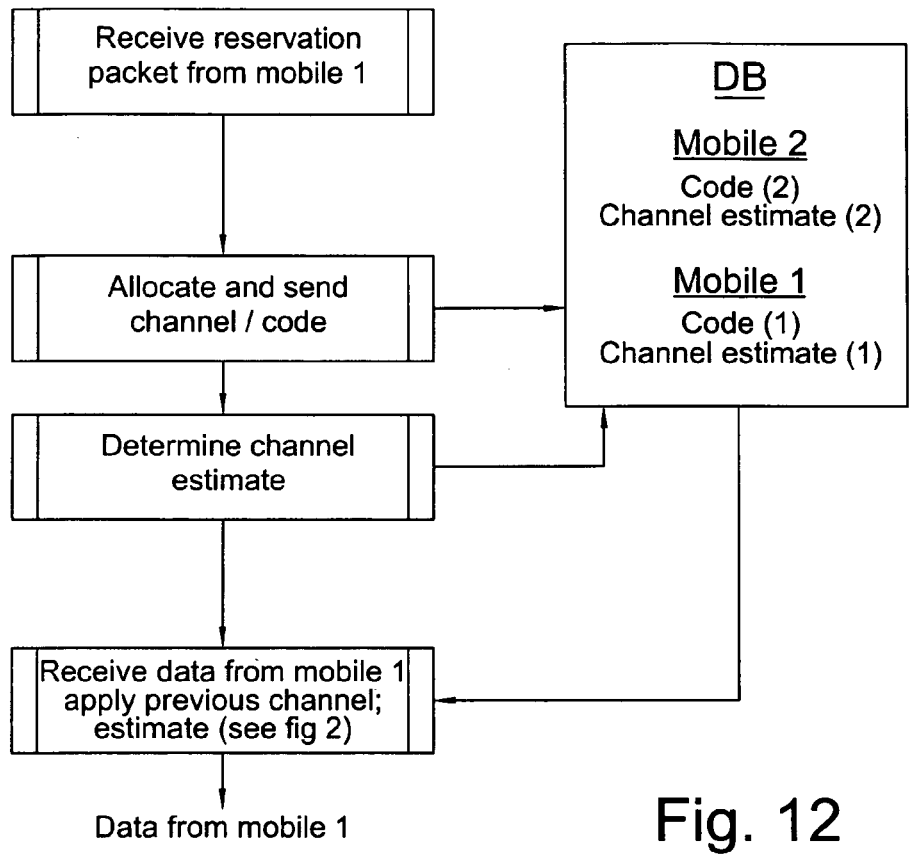
FIG. 12 illustrates an alternative embodiment in which a channel estimate is performed using the reservation packet.

Channel estimation based on reception of reservation packets is illustrated in FIG. 12. The base station receives a reservation packet from a new mobile terminal. From this it determines a channel estimate, and in turn a channel equalisation function. Assuming it has sufficient resources, the base station also allocates a data channel/code for the new mobile, and forwards an acknowledgement ACK signal.

Figure 13:
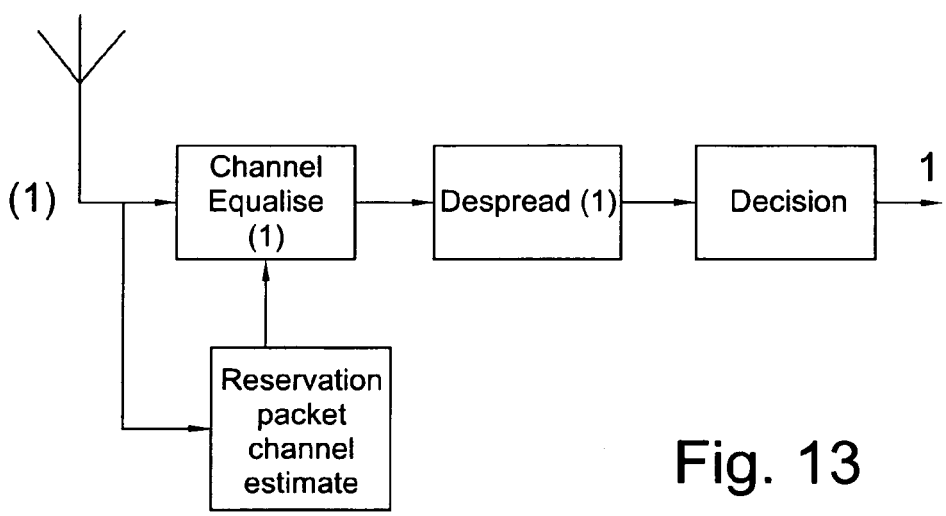
FIG. 13 illustrates part of a base station architecture for channel estimation and equalisation according to an embodiment.

The base station then receives data packets from the mobile using the allocated channel code, and applies the previously determined channel equalisation function. This provides it with an improved signal estimate. FIG. 13 shows the corresponding receiver processing architecture. The channel equalisation, de-spreading and decision functions are as previously described with respect to FIG. 11.

For improved signal reception, a channel estimate based on the received data packets is also calculated, and when determined is applied to the remaining incoming data packets. The channel estimate can be continuously updated as new packets come in, especially in fast changing channels such as indoors. The estimates based on the reservation and incoming data packets can be combined in various ways.

This channel estimation based on the reservation packet can be advantageously combined with interference cancellation using cross-correlation properties determined also from the reservation packet as described above.

For a fast moving (high speed) user profile, with the exception of the channel estimation strategy based on both the reservation packets and dedicated channels (as mentioned above), a poor quality channel estimate is conjectured to adversely impact the performance of the system. Hence, in a further alternative arrangement a switching module adaptively switches between an IC and a non-IC configuration, aiming to minimise the impact of poor quality channel estimates on overall cancellation performance. As the interference contribution from the active users is to be subtracted from the user of interest, a weighing factor (w) is used to avoid degraded performance of the IC module for a configuration with a lower level of confidence in its estimates. If w is set to 1, the structures proposed for example with respect to FIGS. 10 and 11 for cancellation can be applied, whereas with weighing w equal to 0, the system resembles a conventional DS-CDMA receiver. Hence poor quality interference estimates can be weighed low (or zero), in order to avoid the adverse impact that cancellation would have on the desired users overall performance in these circumstances.

The determination of the weighing factor, w, depends on the propagation environment conditions. The criteria for setting of these weights can be based on for example: Doppler Frequency; and/or Variations in Channel Estimate. (rapid channel estimate variations can be an indicative measure of a fast moving environment)

With the IC in place, code tracking (e.g. delay locked loop—DLL) can be significantly enhanced. Of the possible configurations, we can either have
pre-cancellation code tracking or
pre- and post-cancellation tracking or
post-cancellation tracking Examples of this are given in co-pending patent application GB2384665.

Whilst embodiments have been described with respect to OVSF and M-sequence assigned codes, other types of CDMA based codes could also be used; for example Gold Code, Orthogonal Gold Code, Complex Spreading Sequences, Generalised Orthogonal Binary Codes, ZCZ/IFW codes, and LAS-CDMA codes The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

The invention claimed is:

1. A CDMA based wireless base station comprising:
means for receiving a channel request from a mobile terminal;

means for sending an acknowledgement including an assigned code to the mobile terminal;

means for determining the relative transmission timing of the mobile terminal;

means for determining a cross-correlation parameter associated with the requesting mobile terminal assigned code and transmission timing and another mobile terminal communicating with the base station and having another code and transmission timing;

means for receiving data from the requesting mobile terminal using said assigned code and transmission timing; and means for cancelling interference on said received data caused by data received from said other mobile terminal on said other code and other transmission timing, said interference cancellation using the cross-correlation parameter, wherein the means for interference cancelling comprises means for calculating an interference signal associated with the other mobile terminal and means for subtracting this from the received data signal in order to recover the data signal without said interference signal, and wherein an accuracy parameter is calculated for the interfering signal, and wherein a weight is applied to said signal prior to subtraction from the de-spread signal dependent on said accuracy parameter.

2. A base station according to claim 1 wherein the acknowledgement does not include a time alignment parameter.

3. A base station according to claim 1 wherein the assigned code is an OVSF or an M-sequence code.

4. A base station according to claim 1 wherein an initial channel estimate for receiving the data is used and is based on a channel estimate determined from the channel request.

5. A base station according to claim 1 wherein said calculating means comprises means for de-spreading the received data signal according to the code of the assigned code of the requesting mobile, means for estimating symbols associated with said de-spread signal, means for applying said cross-correlation parameter to said estimated symbols in order to provide said interfering signal.

6. A base station according to claim 5 wherein said calculating means further comprises means for channel equalising said received data signal according to a channel estimate associated with said requesting mobile, and means for applying said channel estimate and a channel estimate associated with the other mobile to said estimated symbols.

7. A base station according to claim 5 further comprising cancellation means comprising means for subtracting said interfering signal from said de-spread signal, and means for estimating symbols associated with the resulting signal.

8. A base station according to claim 1 wherein said weight is either 0 or 1.

9. A base station according to claim 1 further comprising means for determining a channel estimate based on the received data and applying this to said data.

10. A method of operating a CDMA based wireless base station, the method comprising:

receiving a channel request from a mobile terminal;

sending an acknowledgement including an assigned code to the mobile terminal;

determining the relative transmission timing of the mobile terminal;

determining a cross-correlation parameter associated with the requesting mobile terminal assigned code and transmission timing and another mobile terminal communicating with the base station and having another code and transmission timing;

receiving data from the requesting mobile terminal using said assigned code and transmission timing; and cancelling interference on said received data caused by data received from said other mobile terminal on said other code and other transmission timing, said interference cancellation using the cross-correlation parameter, wherein the interference cancelling comprises calculating an interference signal associated with the other mobile terminal and subtracting this from the received data signal in order to recover the data signal without said interference signal, wherein an accuracy parameter is calculated for the interfering signal, and wherein a weight is applied to said signal prior to subtraction from the de-spread signal dependent on said accuracy parameter.

11. A method according to claim 10 wherein an initial channel estimate for receiving the data is used and is based on a channel estimate determined from the channel request.

12. A method according to claim 10 wherein said calculating comprises de-spreading the received data signal according to the code of the assigned code of the requesting mobile, estimating symbols associated with said de-spread signal, applying said cross-correlation parameter to said estimated symbols in order to provide said interfering signal.

13. A method according to claim 12 wherein said calculating further comprises channel equalising said received data signal according to a channel estimate associated with said requesting mobile, and applying said channel estimate and a channel estimate associated with the other mobile to said estimated symbols.

14. A method according to claim 12 further comprising cancelling said interfering signal by subtracting said interfering signal from said de-spread signal, and estimating symbols associated with the resulting signal.

15. A method according to claim 10 wherein said weight is either 0 or 1.

16. A method according to claim 10 further comprising determining a channel estimate based on the received data and applying this to said data.

17. A wireless base station comprising:

means for receiving a channel request from a mobile terminal;

means for sending an acknowledgement including an assigned channel to the mobile terminal;

means for determining an initial channel estimate for the mobile terminal based on the channel request;

means for receiving data from the requesting mobile terminal using said assigned code and said initial channel estimate;

means for determining the relative transmission timing of the mobile terminal;

means for determining a cross-correlation parameter associated with the requesting mobile terminal assigned code and transmission timing and another mobile terminal communicating with the base station and having another code and transmission timing; and means for cancelling interference on said received data caused by data received from said other mobile terminal on said other code and other transmission timing, said interference cancellation using the cross-correlation parameter, wherein the means for interference cancelling comprises means for calculating an interference signal associated with the other mobile terminal and means for subtracting this from the received data signal in order to recover the data signal without said interference signal, wherein an accuracy parameter is calculated for the interfering signal, wherein a weight is applied to said signal prior to subtraction from the de-spread signal dependent on said accuracy parameter.

18. A CDMA based base station according to claim 17.

19. A method of operating a base station and comprising:
receiving a channel request from a mobile terminal;
sending an acknowledgement including an assigned channel to the mobile terminal;
determining an initial channel estimate for the mobile terminal based on the channel request;
receiving data from the requesting mobile terminal using said assigned code and said initial channel estimate;
determining the relative transmission timing of the mobile terminal;
determining a cross-correlation parameter associated with the requesting mobile terminal assigned code and transmission timing and another mobile terminal communicating with the base station and having another code and transmission timing; and
cancelling interference on said received data caused by data received from said other mobile terminal on said other code and other transmission timing, said interference cancellation using the cross-correlation parameter,
wherein cancelling interference comprises calculating interference associated with the other mobile terminal and subtracting said calculated interference from the received data to recover the data without said interference, and
calculating an accuracy parameter for the interference and applying a weight to the interference prior to subtraction from a de-spread signal dependent on said accuracy parameter.

20. A computer readable medium encoded with a program for implementing a method according to claim 10.

21. A computer readable medium encoded with a program for implementing a method according to claim 19.

* * * * *